United States Patent [19]

Moosberg

[11] Patent Number: 5,718,392
[45] Date of Patent: Feb. 17, 1998

[54] MULTIPLIER-TYPE FISHING REEL WITH CLOSE-SET SPOOL AND SIDE PLATE

[75] Inventor: Börje Moosberg, Mörrum, Sweden

[73] Assignee: Abu AB, Svängsta, Sweden

[21] Appl. No.: 429,777

[22] Filed: Apr. 27, 1995

[51] Int. Cl.$^6$ ............................................. A01K 89/015
[52] U.S. Cl. ............................................. 242/321; 242/322
[58] Field of Search ........................... 242/321, 319, 242/322

[56] References Cited

U.S. PATENT DOCUMENTS

| | | | |
|---|---|---|---|
| 1,358,049 | 11/1920 | Atwood | 242/321 X |
| 5,503,344 | 4/1996 | Yamaguchi | 242/319 X |

Primary Examiner—Daniel P. Stodola
Assistant Examiner—Emmanuel M. Marcelo
Attorney, Agent, or Firm—Browdy and Neimark

[57] ABSTRACT

A fishing reel of the multiplier type has a frame with two detachable, inner side plates, each having a through opening, and two detachable outer side plates. A line spool is rotatably mounted in the frame between the two inner side plates and has, in the vicinity of each of its ends, a circumferential, substantially radial end flange. The line spool is nonrotatably mounted on a shaft, which extends freely through the openings in the two inner side plates. Each inner side plate has a circumferential, axially inwardly directed flange surrounding the respective end flange of the line spool, and an axially directed first sleeve element coaxial with the line spool. At each end, the line spool has a protruding second sleeve element which is coaxial with the line spool and rotatably mounted in the first sleeve element of the corresponding inner side plate by a ball bearing.

15 Claims, 1 Drawing Sheet

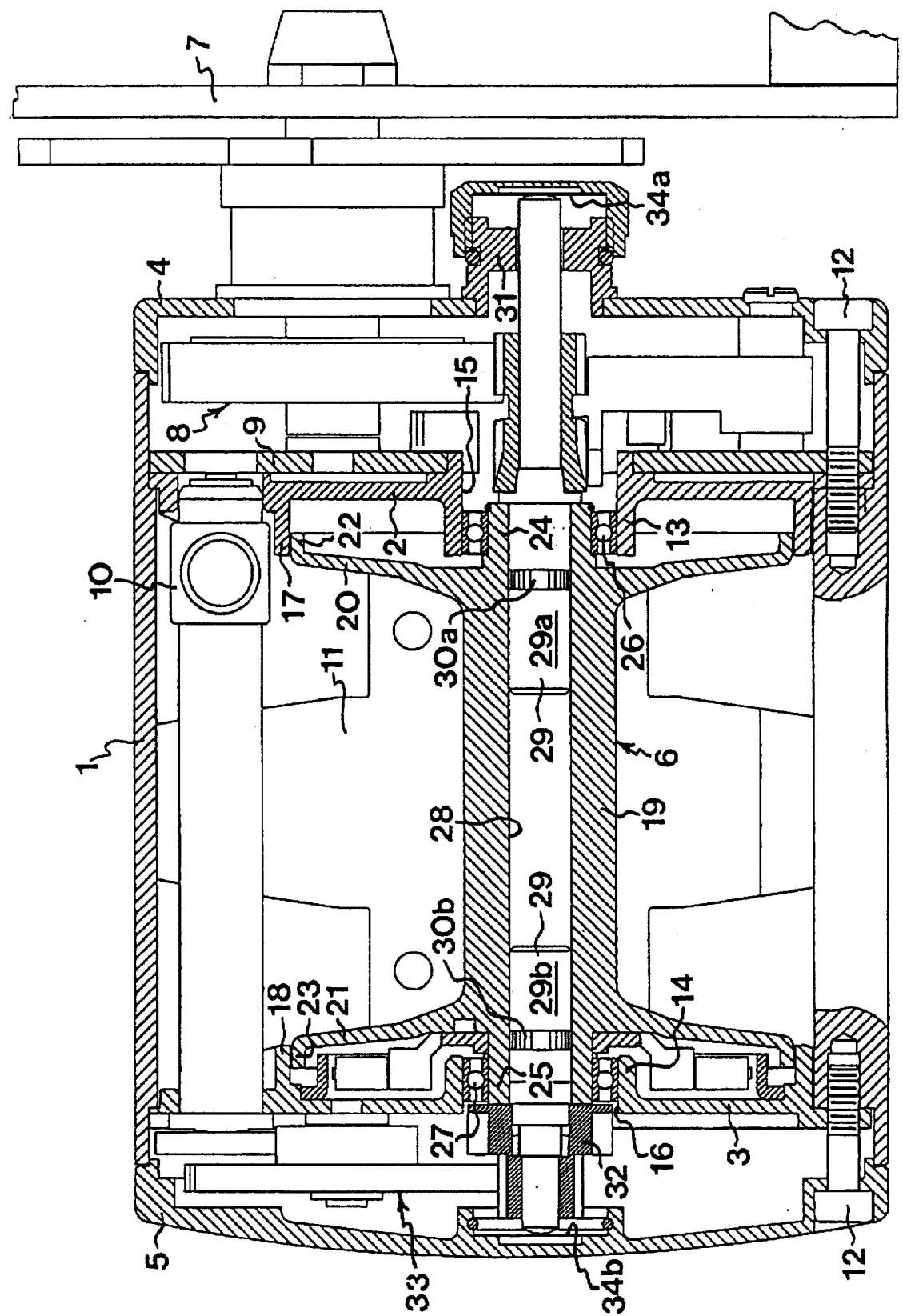

MULTIPLIER-TYPE FISHING REEL WITH CLOSE-SET SPOOL AND SIDE PLATE

BACKGROUND OF THE INVENTION

The present invention relates to a fishing reel of the multiplier type.

Prior-art fishing reels of this type generally have a frame with two inner side plates formed integral therewith, and two detachable outer side plates. A shaft extends through the frame and is mounted in rotary bearings in the two outer side plates. A line spool is nonrotatably mounted on the shaft for rotation therewith. In an alternative embodiment, the shaft mounted in rotary bearings in the outer side plates has been replaced by a shaft supported therein by means of support bearings, and the line spool nonrotatably mounted on the shaft has been replaced by a line spool rotatably mounted on the shaft by means of rotary bearings (see e.g. U.S. Pat. No. 4,919,362). In both of these variants, the line spool is provided at each end with a circumferential, radial end flange placed in a corresponding center opening in the respective inner side plate.

On account of the manufacturing tolerances applying to the components in the fishing reel that affect the mounting of the line spool in the frame, and in particular the manufacturing tolerances applying to the shaft and the outer side plates, a relatively large tolerance play must exist between the outer circumference of each line-spool end flange and the portion of the respective inner side plate defining its center opening. This play causes problems when using thin fishing lines, since these may penetrate into and get stuck between the end flange of the line spool and said portion of the inner side plate. New materials, such as Kevlar®, mean that today's fishing lines can be made considerably thinner than before. This, in turn, means that the risk of the fishing line being wedged in the annular space defined by said tolerance play has increased.

SUMMARY OF THE INVENTION

The object of the present invention therefore is to provide a fishing reel that overcomes, or at least substantially reduces, this risk.

According to the invention, this object has been achieved by a fishing reel of the multiplier type, comprising a frame having two inner side plates, each of which has a through opening and at least one of which is removable from the frame, and two outer side plates removable from the frame;

a line spool which is rotatably mounted in the frame between said two inner side plates and which, in the vicinity of each of its ends, has a circumferential, substantially radial end flange; and a shaft, on which the line spool is nonrotatably mounted and which extends freely through the openings in said inner side plates;

each inner side plate having a circumferential, substantially axially inwardly directed flange, which is coaxial with the line spool and surrounds the respective end flange, and an axially directed first sleeve means coaxial with the line spool, the line spool having at each end a protruding second sleeve means coaxial with the line spool, and one of said first and said second sleeve means being rotatably mounted in the other of said first and said second sleeve means at each end of the line spool.

In a preferred embodiment, the two sleeve means of the line spool are rotatably mounted in the sleeve means of the respective inner side plates by means of ball bearings.

BRIEF DESCRIPTION OF THE DRAWING

The invention will now be described in more detail with reference to the accompanying drawing, illustrating a fishing reel according to the invention in longitudinal section.

DESCRIPTION OF THE PREFERRED EMBODIMENT

The fishing reel illustrated in the drawing is of the multiplier type and has a substantially circular-cylindrical frame 1, which is of the type shown in Applicant's copending U.S. patent application entitled "Method for making a frame for fishing reels of the multiplier type", filed on Mar. 31, 1995. Moreover, the fishing reel has two detachable inner side plates 2 and 3, and two detachable outer side plates 4 and 5. The fishing reel also has a line spool 6 for receiving a fishing line (not shown) and mounted in the frame 1 between the two inner side plates 2 and 3, a handle 7 with an associated transmission mechanism 8 for rotation of the line spool 6, a mounting plate 9 fixed to the right-hand inner side plate 2 and carrying the handle 7 and the transmission mechanism 8, a level-wind mechanism 10 mounted in the frame 1 between the two inner side plates 2 and 3, and a foot 11 which is riveted to the frame 1 and by means of which the fishing reel can be mounted on a fishing rod (not shown).

The handle 7 with the associated transmission mechanism 8, the mounting plate 9 and the other components carried thereby, the level-wind mechanism 10 and the foot 11 lack importance for the inventive concept and, therefore, will not be described in more detail here.

The inner side plates 2 and 3, the outer side plates 4 and 5, as well as the mounting plate 9, all having circular shape, are fixed to the frame 1 by means of screws 12.

Each of the two inner side plates 2 and 3 has a centrally-positioned, axially-directed sleeves means 13 and 14, respectively, defining a central, circular through opening 15 and 16, respectively, in each inner side plate. Each of the two inner side plates 2 and 3 further has a circumferential, axially inwardly directed flange 17 and 18, respectively, coaxial with the central opening 15 and 16, respectively.

The line spool 6 has a cylindrical body 19, which is provided at each end with a circumferential, substantially radial end flange 20, 21. The end flanges 20 and 21 each have an axially outwardly directed circumferential flange 22 and 23, respectively, surrounded by the circumferential flange 17 and 18, respectively, of the inner side plates 2 and 3. At each end, the body 19 of the line spool 6 has an extension coaxial with the line spool and forming a sleeve means 24, 25 axially protruding from the line spool 6. In the illustrated embodiment, the outer diameter of the sleeve means 24 and 25 is considerably smaller than the inner diameter of the sleeve means 13 and 14, respectively. The sleeve means 24 and 25 extend into the sleeve means 13 and 14, respectively, and are rotatably mounted therein by means of ball bearings 26 and 27, respectively. The line spool 6 has an axial center bore 28, which extends through the spool body 19 and the two sleeve means 24 and 25.

In an alternative embodiment (not shown), the outer diameter of the sleeve means 13 and 14 is considerably smaller than the inner diameter of the sleeve means 24 and 25, respectively. In this alternative embodiment, the sleeve means 13 and 14 extend into the sleeve means 24 and 25, respectively, and are rotatably mounted therein by means of intermediate ball bearings.

The circumferential flanges 22 and 23 of the line spool 6 have an outer diameter which is but insignificantly smaller than the inner diameter of the circumferential flanges 17 and 18, respectively, of the inner side plates 2 and 3. Thus, a very small play exists between the circumferential flanges in the respective pairs of circumferential flanges 17 and 22, and 18 and 23. This small play is made possible by the line spool 6 being rotatably mounted directly in the two inner side plates 2 and 3, and by the mounting, as will be appreciated from the following, being independent of the manufacturing tolerances of the other components. The play is so small that not even today's thin fishing lines can penetrate in between the circumferential flange 22 of the line spool 6 and the circumferential flange 17 of the inner side plate 2, or between the circumferential flange 23 of the line spool 6 and the circumferential flange 18 of the inner side plate 3.

The shaft 29 of the line spool 6 preferably consists of two shaft members 29a and 29b. The shaft members 29a and 29b each have a circumferential, knurled portion 30a and 30b, respectively, and are inserted with close fit in the center bore 28 of the line spool 6 for axial friction. The line spool 6 thus is nonrotatably connected to the shaft 29. The right shaft member 29a in a disengageable engagement (not described in more detail here) with the transmission mechanism 8 for rotating the line spool 6 when the handle 7 is turned for winding the fishing line on the line spool 6. The right shaft member 29a freely extends through the right-hand inner side plate 2 (i.e. without contacting the inner side plate 2) and the mounting plate 9 into the right-hand outer side plate 4, in which it is loosely mounted in a support bearing 31, whose inner diameter is considerably larger than the diameter of the right shaft member 29a in order to make it possible to take up any shaft skewness in the support bearing 31. The left shaft member 29b extends through the left-hand inner side plate 3 and non-rotatably supports outside this side plate a gear unit 32 meshing with a transmission mechanism 33 for driving the level-wind mechanism 10. At their outer ends, the two shaft members 29a and 29b bear on a resilient friction element 34a and 34b, respectively, for adjustable braking of the shaft 29 and hence of the line spool 6.

What I claim and desire to secure by Letters Patent is:

1. A fishing reel of the multiplier type, comprising a frame having two inner side plates, each of which has a through opening and at least one of which is removable from the frame, and two outer side plates removable from the frame;

a line spool which is rotatably mounted to the frame between said two inner side plates and which includes axial ends defined by respective circumferential, substantially radial end flanges; and a shaft, on which the line spool is nonrotatably mounted and which freely extends through the openings in said inner side plates;

each of the inner side plates including a circumferential substantially axially inwardly directed flange, which is coaxial with the line spool and surrounds an adjacent end flange, and an axially directed first sleeve coaxial with the line spool, the line spool having at each end a protruding second sleeve coaxial with the line spool, and rotation means for one of said first sleeve and said second sleeve being rotatably mounted in the other of said first sleeve and said second sleeve at each end of the line spool.

2. A fishing reel as claimed in claim 1, wherein said one of said sleeve first and said second sleeve is said second sleeve.

3. A fishing reel as claimed in claim 1, wherein said one of said first sleeve and second sleeve is mounted in another sleeve by means of a ball bearing.

4. A fishing reel as claimed in claim 1, wherein said first sleeve defines the through opening of the respective inner side plate.

5. A fishing reel of the multiplier type having a frame;

two side plates, each mounted on the frame and each having a respective side plate through opening;

a line spool having spool ends and being disposed between the side plates;

each of the spool ends including a respective spool flange; each spool flange including a generally radial surface and a spool flange end surface; and a shaft including shaft portions disposed through the line spool and through each side plate opening;

wherein the improvement comprises:

means for rotatably supporting the line spool directly on the side plates;

each of the side plates including a side plate flange having a side flange surface adjacent the respective spool flange end surface;

the shaft freely extending through each side plate opening; and the shaft being nonrotatably fixed in the line spool;

whereby the side flange surface and the spool flange end surface will not contact one another during spool rotation when a lateral play of the means for rotatably supporting the line spool on the side plates is no greater than a gap between the side flange surface and the spool flange end surface.

6. The improvement according to claim 5, wherein the means for rotatably supporting the line spool on the side plates comprises bearings.

7. The improvement according to claim 6, wherein the bearings include ball bearings.

8. The improvement according to claim 6, wherein the bearings each have a respective inner surface and a respective outer surface and line spool and the side plates include sleeve means for holding the bearings on the inner surface and the outer surface.

9. The improvement according to claim 8, wherein the sleeve means for holding the bearings includes a sleeve means inner flange of at least one of the side plates.

10. The improvement according to claim 5, wherein the side flange surface and the respective spool flange end surface comprise coaxial overlapping cylindrical surfaces.

11. The improvement according to claim 5, comprising a mechanism mounted on the frame, outside the side plates distal the spool, said mechanisms rotationally engaging the shaft.

12. The improvement according to claim 11, comprising outer side plates covering the mechanism.

13. The improvement according to claim 5, wherein the shaft comprises a pair of shaft members each attached to a respective line spool end.

14. The improvement according to claim 13, wherein each of the shaft members is held by axial friction in a line spool center bore.

15. The improvement according to claim 14, further comprising friction increasing means for increasing friction on each of the shaft members, said friction increasing means including knurled portions.

* * * * *